United States Patent
Ladra et al.

(10) Patent No.: US 9,316,283 B2
(45) Date of Patent: Apr. 19, 2016

(54) VELOCITY-PROPORTIONAL ACTIVE VIBRATION DAMPING

(71) Applicant: SIEMENS AKTIENGESELLSCHAFT, München (DE)

(72) Inventors: Uwe Ladra, Erlangen (DE); Elmar Schäfers, Fürth (FI); Torsten Schür, Erlangen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 475 days.

(21) Appl. No.: 13/630,812

(22) Filed: Sep. 28, 2012

(65) Prior Publication Data

US 2013/0085617 A1    Apr. 4, 2013

(30) Foreign Application Priority Data

Sep. 30, 2011 (EP) .................................. 11 183 451

(51) Int. Cl.
*G05B 21/00*    (2006.01)
*F16F 15/00*    (2006.01)
(Continued)

(52) U.S. Cl.
CPC ............. F16F 15/002 (2013.01); B66C 13/066 (2013.01); F16F 7/1011 (2013.01)

(58) Field of Classification Search
CPC ...... G05D 19/02; F16F 7/1011; F16F 7/1005; F16F 7/1022; F16F 7/116; F16F 15/002; F16F 15/02; F16F 15/22; F16F 15/223; F16F 15/00; F16F 15/005; F16F 15/022; F16F 15/027; F16F 15/03; F16F 15/08; F16F 15/123; F16F 15/1435; F16F 15/145; F16F 15/16; F16F 9/20; F16F 9/53; F16F 9/535; F16F 13/305; F16F 2224/045; B64C 27/001; B64C 11/008; B64C 2027/004; B64C 2027/005; B64C 2260/96; B64C 2270/334; G05B 2219/39199; G05B 2219/41117; G05B 2219/49054; G05B 2219/41191; G05B 2219/49048; B66C 13/066

USPC ......................................................... 700/280

See application file for complete search history.

(56) References Cited

U.S. PATENT DOCUMENTS 4,083,433 A * 4/1978 Geohegan et al. ............ 188/382
4,613,243 A * 9/1986 Rossi et al. .............. 400/124.22

(Continued)

FOREIGN PATENT DOCUMENTS

CN    101220845 A    7/2008
CN    101438078 A    5/2009

(Continued)

*Primary Examiner* — Robert Fennema
*Assistant Examiner* — Sivalingam Sivanesan
(74) *Attorney, Agent, or Firm* — Henry M. Feiereisen LLC

(57) ABSTRACT

An active vibration damper has a damping device arranged on a vibration-susceptible mechanical structure. A force can be injected directly into the vibration-susceptible mechanical structure with the damping device. A damping force which damps a vibration of the mechanical structure is determined by a control device of the active vibration damper with reference to an absolute movement of the mechanical structure in space. A damping drive of the damping device which is arranged on the mechanical structure is activated by the control device in accordance with the determined damping force such that the determined damping force is injected into the mechanical structure with the damping drive. The control device determines the damping force such that the damping force is proportional at all times to the instantaneous velocity of the mechanical structure.

9 Claims, 3 Drawing Sheets

(51) Int. Cl.
*B66C 13/06* (2006.01)
*F16F 7/10* (2006.01)

(56) References Cited

U.S. PATENT DOCUMENTS

| | | | |
|---|---|---|---|
| 4,635,892 A | | 1/1987 | Baker |
| 4,887,699 A | | 12/1989 | Ivers |
| 5,033,028 A | * | 7/1991 | Browning ............... 367/1 |
| 5,062,657 A | * | 11/1991 | Majeed ............... 280/5.503 |
| 5,255,764 A | | 10/1993 | Kurabayashi et al. |
| 5,631,209 A | * | 5/1997 | Lange et al. ............... 504/248 |
| 2005/0082994 A1 | | 4/2005 | Qiu et al. |
| 2010/0131114 A1 | | 5/2010 | Stothers et al. |
| 2010/0204881 A1 | * | 8/2010 | Muragishi et al. ............... 701/36 |

FOREIGN PATENT DOCUMENTS

| | | | |
|---|---|---|---|
| EP | 0841296 | A1 | 5/1998 |
| EP | 2023007 | A1 | 2/2009 |
| EP | 2327651 | A1 | 6/2011 |
| GB | 2447231 | A | 9/2008 |
| JP | 3200694 | A | 9/1991 |
| JP | 2004211741 | A | 7/2004 |
| JP | 2011012757 | A | 1/2011 |
| WO | WO 03000004 | A2 | 1/2003 |
| WO | WO 2009075151 | A1 * | 6/2009 |
| WO | WO 2011101997 | A1 | 8/2011 |

* cited by examiner

VELOCITY-PROPORTIONAL ACTIVE VIBRATION DAMPING

CROSS-REFERENCES TO RELATED APPLICATIONS

This application claims the priority of European Patent Application EP11183451, filed Sep. 30, 2011, pursuant to 35 U.S.C. 119(a)-(d), the content of which is incorporated herein by reference in its entirety as if fully set forth herein.

BACKGROUND OF THE INVENTION

The present invention relates to a method for operating an active vibration damper which includes a damping device that is arranged on a vibration-susceptible mechanical structure. The present invention further relates to a control program for operating an active vibration damper, a control device for an active vibration damper and an active vibration damper.

It would be desirable and advantageous to obviate prior art shortcomings and to provide an improved approach efficiently damping vibrations and preferably suppressed such vibrations as soon as they appear.

SUMMARY OF THE INVENTION

According to one aspect of the present invention, a method for operating an active vibration damper having a damping device arranged on a vibration-susceptible mechanical structure includes the steps of determining with a control device—based on an absolute movement of the mechanical structure in space—a damping force damping a vibration of the mechanical structure, wherein the damping force is proportional at all times to an instantaneous velocity of the mechanical structure, controlling with the control device a damping drive of the damping device, which is arranged on the mechanical structure, commensurate with the determined damping force, and directly injecting with the damping drive the determined damping force into the mechanical structure.

By virtue of this procedure, the excitation of a vibration can already be damped, even if the frequency and the amplitude of the vibration excitation are not known or are not yet known.

According to an advantageous feature of the present invention, a proportionality factor between the instantaneous velocity of the mechanical structure and the damping force that is exerted on the mechanical structure may be specified to the control device externally. By virtue of this procedure, the damping of the vibration may be adjusted as required. In order to allow the external specification of the proportionality factor, the control device that performs the operating method may be configured to execute, for example, a control program and the control device may receive the proportionality factor as a parameter during the execution of the control program.

As an alternative to specifying the proportionality factor externally, the control device may automatically correct a proportionality factor between the instantaneous velocity of the mechanical structure and the damping force that is exerted on the mechanical structure, such that a natural vibration of the mechanical structure is damped in a predefined manner. By virtue of this procedure, self-adapting operation of the active vibration damper is effected.

The extent to which an occurring vibration is damped can be defined as required. Advantageously, a resulting damping of a vibration of the mechanical structure may be no greater than the maximal damping that is required in order to match the non-periodic limit of a natural vibration of the mechanical structure.

According to an advantageous feature of the present invention, the damping drive may be designed as an electric direct linear drive that has a stator, wherein the stator is permanently connected to the mechanical structure and acting both on the mechanical structure and on an armature that is mobile relative to the mechanical structure.

It is in principle sufficient, with reference to the absolute velocity of the mechanical structure, directly to define the damping force that must be exerted on the mechanical structure in accordance with the relationship $$m \cdot aD^* = FD^* = d \cdot v \qquad (1).$$

In equation 1, m is the mass that is moved by the stator and aD* is the reference acceleration of the mass that is moved. FD* is the damping force that is exerted on the mechanical structure by the mobile mass. d is a desired damping factor that is in principle freely selectable. v is the absolute velocity of the vibration-susceptible mechanical structure in space. However, better results can be obtained in many cases by integrating equation 1 relative to time, thereby producing the relationship $$m \cdot vD^* = d \cdot x \qquad (2),$$

which is essentially equivalent. In equation 2, vD* is the reference velocity of the armature relative to the vibration-susceptible mechanical structure. x is the displacement of the mechanical structure from a reference position. m and d have the same significance as in equation 1.

The control device can therefore determine a displacement of the mechanical structure from a reference position, and indirectly determine the damping force that is proportional at all times to the instantaneous velocity of the mechanical structure by determining a reference velocity of the armature relative to the mechanical structure in such a way that the reference velocity is proportional at all times to the instantaneous displacement of the mechanical structure from the reference position.

According to another advantageous feature of the present invention, the activation of the damping drive commensurate with the determined damping force may be integrated into a superordinate position control, whereby a displacement of the armature from a rest position relative to the mechanical structure, as caused by the activation of the damping drive according to the determined damping force, is superimposed by a return movement by means of which the armature is moved to the rest position or to a rest region containing the rest position and/or for the travel of the armature to be limited by the control device to a permitted region of travel containing the rest position. This ensures that the armature is only moved within its permitted region of travel.

An additional mass may be arranged on the armature of the electric direct linear drive if necessary.

According to another aspect of the invention, a control program stored on a non-transitory medium and comprising machine code which, when executed by a control device operating an active vibration damper having a damping device arranged on a vibration-susceptible mechanical structure, causes the control device to operate the active vibration damper by determining, based on an absolute movement of the mechanical structure in space, a damping force damping a vibration of the mechanical structure, wherein the damping force is proportional at all times to an instantaneous velocity of the mechanical structure, controlling a damping drive of the damping device, which is arranged on the mechanical structure, commensurate with the determined damping force, and directly injecting with the damping drive the determined damping force into the mechanical structure.

According to yet another aspect of the invention, a control device for controlling an active vibration damper having a damping device arranged on a vibration-susceptible mechanical structure, wherein the control device configured to operate the active vibration damper by determining, based on an absolute movement of the mechanical structure in space, a damping force damping a vibration of the mechanical structure, wherein the damping force is proportional at all times to an instantaneous velocity of the mechanical structure, controlling a damping drive of the damping device, which is arranged on the mechanical structure, commensurate with the determined damping force, and directly injecting with the damping drive the determined damping force into the mechanical structure.

According to yet another aspect of the invention, an active vibration damper includes a damping device arranged on a vibration-susceptible mechanical structure and comprising a damping drive configured to directly inject a damping force into the mechanical structure, sensors configured to measure an absolute movement of the mechanical structure in space, and a control device connected with the sensors for data transfer for receiving values measured by the sensors and connected with the damping drive for controlling the damping drive. The control device is configured to execute the aforedescribed method.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
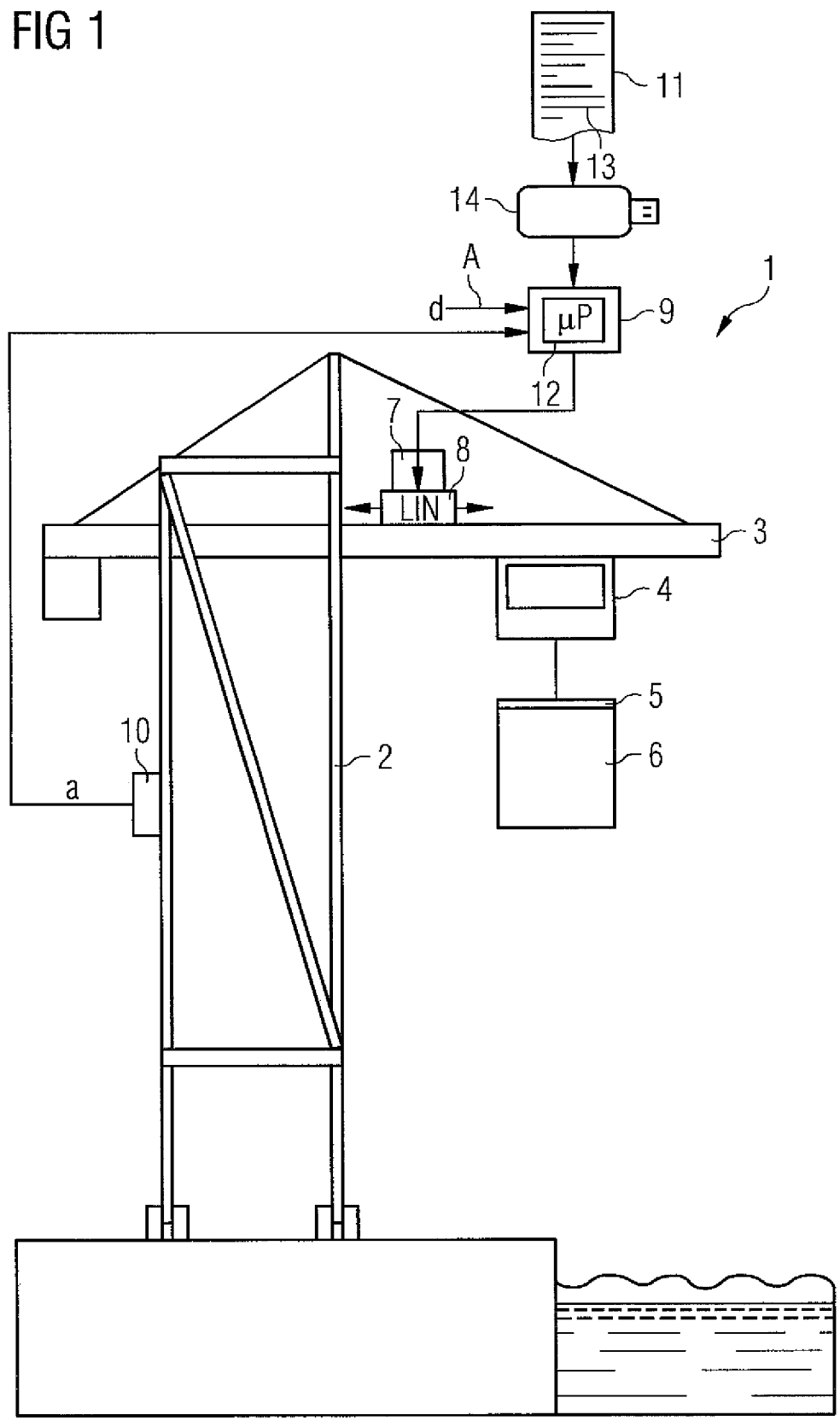
FIG. 1 shows a vibration-susceptible mechanical structure and an active vibration damper according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown in a schematic diagram a container crane 1. The container crane 1 includes a crane framework 2, which in turn comprises a jib 3. A crab 4 can be moved on the jib 3. A so-called spreader 5 is arranged on the crab 4 in such a way that it can be raised and lowered. Containers 6 can be grasped and moved by means of the spreader 5. Container cranes 1 such as the container crane 1 illustrated in FIG. 1 are often used in ports for the transshipment of containers from land to ship and vice versa.

Linear vibrations of the crane framework 2 can be excited by the travel movements of the crab 4 in particular, such that the crane framework 2 oscillates back and forth in the travel direction of the crab 4. The vibration is of relatively low frequency, typically less than one Hertz. It can have a relatively long stroke, e.g. up to one meter. The crane framework 2 is therefore a vibration-susceptible mechanical structure 2 within the meaning of the present invention.

Vibrations of the vibration-susceptible mechanical structure 2 should be damped. An active vibration damper is provided for this purpose. The active vibration damper features a damping device by means of which a force FD* (referred to below as damping force FD*) can be injected directly into the vibration-susceptible structure 2. The damping device is arranged on the vibration-susceptible structure 2. It comprises a damping drive 8. The active vibration damper additionally features a control device 9 and sensors 10.

The damping drive 8 is preferably designed as an electric direct linear drive. In this case, the stator of the damping drive 8 is permanently connected to the mechanical structure 2. The stator acts both on the mechanical structure 2 and on an armature of the damping drive 8, the armature being mobile relative to the stator and hence relative to the mechanical structure 2 also. An additional mass 7 can be arranged on the armature.

The mobile mass (i.e. the mass of the armature plus the mass of the additional mass 7) is mobile relative to the vibration-susceptible mechanical structure 2. The damping drive 8 is arranged on the vibration-susceptible mechanical structure 2 and is permanently connected thereto. It acts on the mobile mass. The mobile mass can be moved relative to the vibration-susceptible mechanical structure 2 by means of the damping drive 8. The mobile mass in turn acts on the mechanical structure 2 via the damping drive 8 alone.

An absolute movement of the vibration-susceptible mechanical structure 2 in space can be captured by means of the sensors 10. In particular, an acceleration of a vibration-susceptible mechanical structure 2 can be captured by means of the sensors 10.

The control device 9 has a data connection to the sensors 10 for the purpose of receiving variables that are captured by the sensors 6. It is so designed as to operate the active vibration damper in accordance with an operating method that is explained in greater detail below.

The control device 9 is usually designed as a software programmable control device 9. The functionality of the control device 9 is therefore defined by a control program 11, by means of which the control device 9 is programmed and which therefore effects the corresponding configuration of the control device 9.

The control device 9 normally features an internal microprocessor 12 as per the illustration in FIG. 1. The control program 11 comprises machine code 13 that can be directly executed by the control device 9 (more precisely: by the microprocessor 12 of the control device 9). The execution of the machine code 13 causes the control device 9 to operate the active vibration damper in accordance with the inventive operating method.

The control program 11 can be supplied to the control device 9 in any way. For example, the control program 11 can be stored on a data storage medium 14 in machine-readable form, in particular in electronic form, and supplied to the control device 9 via the data storage medium 14. Solely by way of example, the data storage medium 14 according to FIG. 1 is designed as a USB memory stick. However, this embodiment can easily be varied.

The inventive operating method is explained in greater detail with reference to FIG. 2, which shows the basic principle of signal processing and preparation, this being performed internally by the control device 9. The mathematical/physical principles are described in greater detail first.

A person skilled in the art knows that the (mechanical) vibration of the vibration-susceptible mechanical structure 2 can be described by the equation $$a+2d \cdot v+\omega 0^2 x = F \quad (3).$$

In this context, x is the displacement of the mechanical structure 2 from a reference position x0, which is in principle freely selectable. v is the first temporal derivation of the displacement x, i.e. the velocity of the mechanical structure 2. Similarly, a is the second temporal derivation of the displacement x, i.e. the acceleration of the mechanical structure 2. $\omega 0$ is a circular natural frequency, i.e. the natural frequency of a natural vibration of the mechanical structure 2 multiplied by $2\pi$. d is a damping factor. F is an external excitation.

The variables x, v and a are time-dependent. The variables $\omega 0$ and d are temporally constant. The external force F can be time-dependent (forced vibration) or constant, having the value 0 in particular (free vibration).

If the external excitation F has the value 0, the formulation $$x = A \cdot \exp(\lambda t) \quad (4)$$

produces the (real or complex) values $$\lambda_{1/2} = -d \pm \sqrt{d^2 - \omega 0^2} \quad (5)$$

as solutions to the differential equation (3).

Depending on the value of the discriminant $d^2-\omega 0^2$, either a "true" damped vibration ($d<\omega 0$) or the non-periodic limit ($d=\omega 0$) or the creep case ($d>\omega 0$) is produced. In each case, however, the resulting damping force FD* is proportional to the instantaneous velocity v of the mechanical structure 2.

The mechanical structure 2 itself (i.e. without taking into consideration the active vibration damper) often has only a very small damping factor d ($d/\omega 0 \ll 1$). The quotient of damping factor d at natural circular frequency $\omega 0$ is usually less than 0.1, and often even less than 0.01. By virtue of the inventive manner as described below of activating the active vibration damper, the effective damping factor d can however be significantly increased. It can even be increased to such an extent that the resulting damping of the vibration of the mechanical structure 2 is at least as great as the maximal damping that is required in order to match the non-periodic limit of the natural vibration of the mechanical structure 2. The damping factor d can therefore be defined such that $$d = \omega 0 \quad (6).$$

An even greater damping factor d can be selected, such that $$d > \omega 0 \quad (7).$$

However, this is not normally recommended.

The adjustment of the damping force FD* that is required for this purpose takes place according to FIG. 2 as follows:

The velocity v of the mechanical structure 2 is determined from the variables a that are captured by the sensors 10. With regard to the capture of the acceleration a, for example, the acceleration a can be integrated in an integrator 15. The output signal of the integrator 15, i.e. the velocity v, is multiplied by the desired damping factor d in a multiplier 16.

The damping factor d can be permanently specified. However, it is preferably adjustable.

The output signal of the multiplier 16, possibly after filtering in a filter 17, is supplied as desired damping force FD* to a force regulator 18, which itself acts on the damping drive 8.

The control device 9 features a control connection to the damping drive 8 for this purpose, i.e. for the purpose of activating the damping drive 8.

The damping drive 8 is therefore activated by the control device 9 in accordance with the determined damping force FD*. As a result, the mobile mass is moved in a corresponding manner relative to the mechanical structure 2 at the same time. Since the damping drive 8 is supported on the mechanical structure 2 and acts on the mobile mass, the damping force FD* is injected directly into the mechanical structure 2. Since the damping force FD* was determined by the control device 9 on the basis of the procedure that was explained above with reference to FIG. 2, the damping force FD* that is exerted on the mechanical structure 2 by the mobile mass via the damping drive 8 is proportional at all times to the instantaneous velocity v of the mechanical structure 2. The vibration of the mechanical structure 2 is therefore damped correspondingly.

Figure 2:
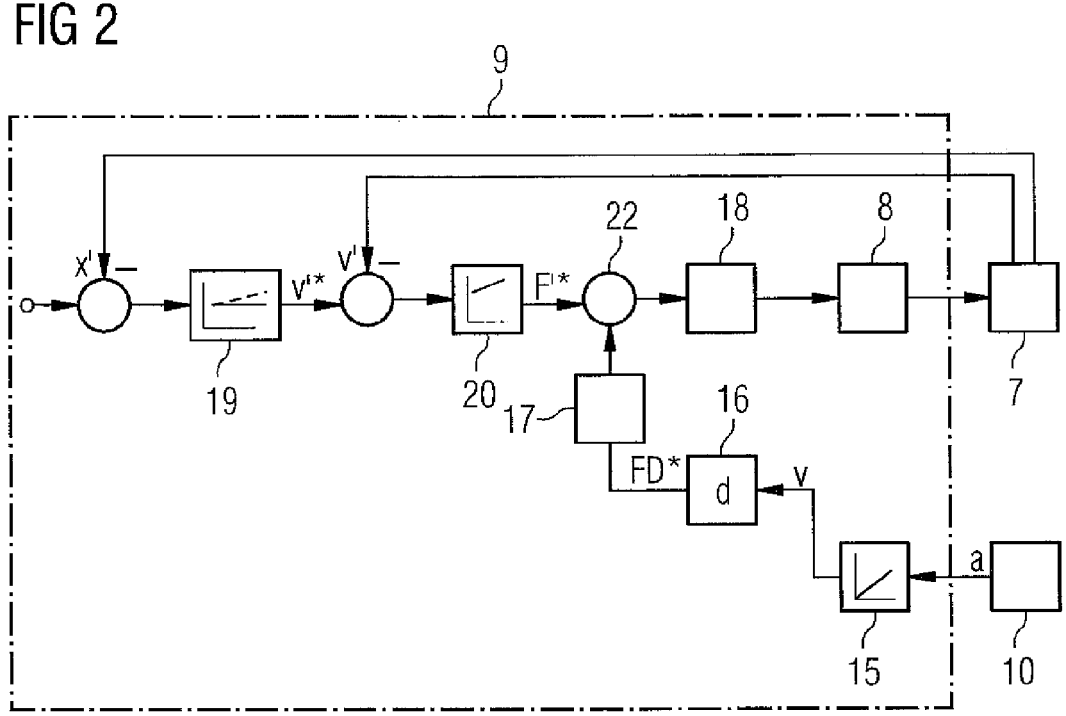
FIG. 2 shows an activation model according to the present invention.

In order to ensure that the armature is only moved within a permitted region of travel, the previously explained structure from FIG. 2 can be supplemented as per FIG. 2 by a position regulator 19 and a subordinate velocity regulator 20. In this case, the position regulator 19 is preferably designed as a PI regulator (PI=proportional–integral), the integral part and usually also the proportional part of the position regulator 19 are relatively weak. The velocity regulator 20 can be designed as a P regulator or as a PI regulator.

A permanent position reference value x'* relative to the mechanical structure 2 is specified to the position regulator 19 as a reference variable and should lie approximately in the middle of the permitted region of travel of the armature. The actual position x' of the armature relative to the mechanical structure 2 is supplied to the position regulator 19 as an actual value.

On the basis of the position reference value x'* and the actual position x', the position regulator 19 determines a supplementary reference velocity v'*, which is supplied to the velocity regulator 20 as its reference value. The actual velocity v' of the armature relative to the mechanical structure 2 is supplied to the velocity regulator 20 as an actual value. On the basis of the reference-actual comparison, the velocity regulator 20 determines a supplementary force reference value F'*, which is additively applied to the damping force FD* of the multiplier 16.

Using this embodiment, the activation of the damping drive 8 according to the damping force FD* is therefore superimposed by the position control. By virtue of the embodiment of the position regulator 19 as a PI regulator and the specification of the permanent position reference value x'*, the displacement of the armature that is effected by the damping force FD* is therefore superimposed by a return movement, by means of which the armature is moved to a rest position.

The position reference value x'* can also be varied, e.g. within a rest region containing the rest position, in phase with or in counter-phase with the actual travel movement of the armature relative to the mechanical structure 2. The rest region is a (normally relatively small) partial region of the permitted region of travel in this case.

As an alternative or in addition to being integrated into the superordinate position control, the control device 9 could e.g. capture the actual travel path of the armature and modify the activation of the damping drive 8 in such a way that the travel of the armature is limited to the permitted travel region.

Disregarding the factor 2 in equation 3 and the possible filtering in the filter 17, the damping factor d corresponds to a proportionality factor between the instantaneous velocity v of the mechanical structure 2 and the damping force FD* that is exerted on the mechanical structure 2. It is possible for the damping factor d of the control device 9 to be permanently specified, e.g. defined as such by the control program 11. However, it is preferably possible for the damping factor d to be specified to the control device 9 externally. This is indicated in FIG. 1 by an arrow designated A. In the case explained here in particular, in which the control device 9 executes the control program 11 in order to perform the operating method, it is therefore possible for the control device 9 to receive the damping factor d as a parameter during the execution of the control program 11.

Alternatively, the control device 9 can automatically correct the damping factor d in such a way that a natural vibration of the mechanical structure is damped in a predefined manner. This is explained in greater detail below with reference to FIG. 3.

Figure 3:
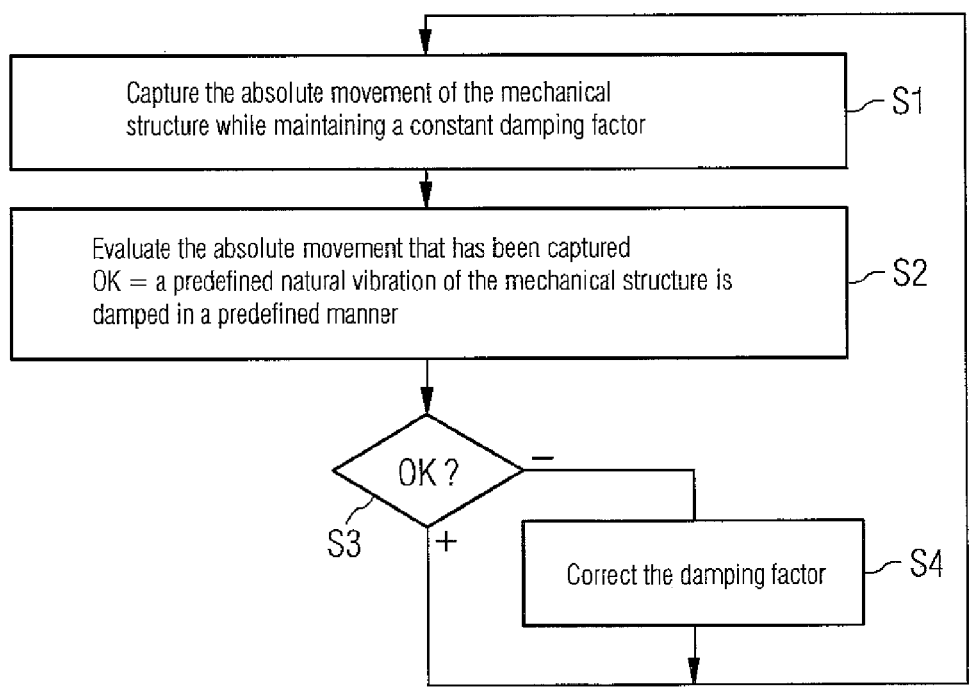
FIG. 3 shows a flow diagram according to the present invention.

According to FIG. 3, the control device 9 captures the absolute movement of the mechanical structure 2 over an extended time period in a step S1. The damping factor d is held constant during this time period.

In a step S2, the control device 9 evaluates the absolute movement that is captured (more precisely: its temporal course). The control device 9 can perform a Fourier analysis or determine an autocorrelation function, for example. The result of the step S2 is the value of a logical variable OK. The logical variable OK only assumes the value TRUE if a predefined natural vibration of the mechanical structure 2, e.g. its fundamental vibration, is damped in a predefined manner. For example, it can be specified that damping of at least 50% (or 70% or other suitable value) occurs per period of the corresponding natural vibration.

In a step S3, the control device 9 checks the value of the logical variable OK. If the logical variable OK has the value TRUE, no further measures are taken. Otherwise, the control device 9 corrects the damping factor d in a step S4, such that the corresponding natural vibration is damped in the desired manner.

The procedure explained above might already produce sufficiently good results. In the case of the procedure according to FIG. 2, it is however also possible that despite application of the corresponding damping force FD* to the damping drive 8, the damping force that is actually produced by the mobile mass may be lower or fluctuate considerably. This may be caused by frictional losses in the damping drive 8 or an excessive adhesion of the armature, for example. The cited effects are particularly apparent in the case of relatively low damping forces FD* in conjunction with a relatively high static friction of the armature. In many cases, it is therefore advantageous to modify the procedure in FIG. 2 according to FIG. 4.

Figure 4:
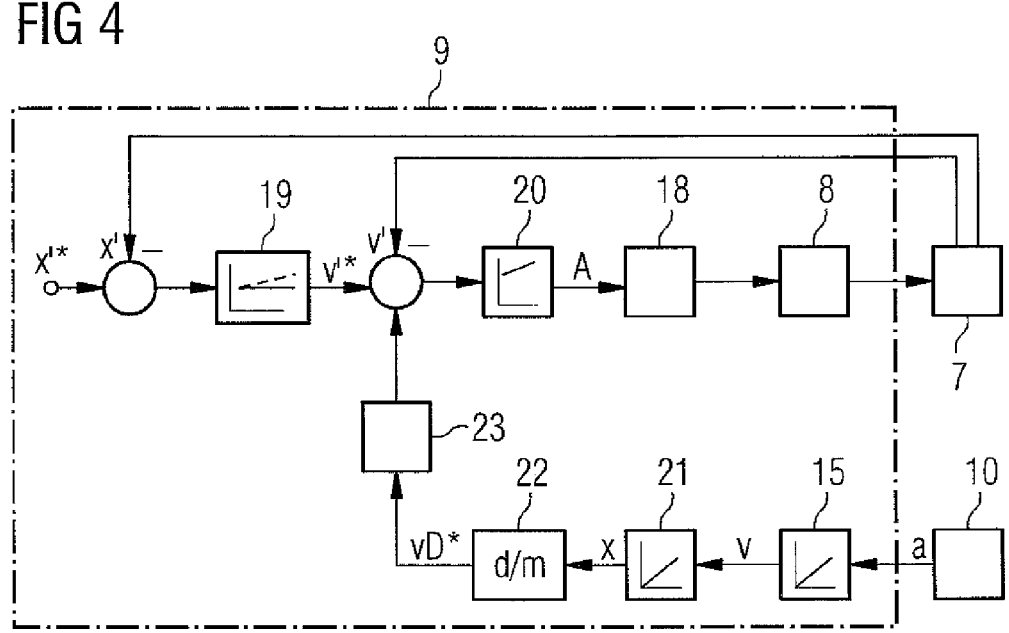
FIGS. 4 and 5 show additional possible activation models.

According to FIG. 4, the velocity v of the mechanical structure 2 is integrated in a further integrator 21 and the displacement x of the mechanical structure 2 from the reference position x0 is determined thus. The displacement x is multiplied by the factor d/m in a multiplier 22, d being the desired damping factor and m being the mass of the mobile mass. Filtering takes place in a filter 23 if necessary. The value that is thus determined corresponds to a reference velocity vD* of the armature relative to the mechanical structure 2. It is supplied to the velocity regulator 20 as a compensation reference value.

The procedure in FIG. 2 corresponds mathematically to the procedure in FIG. 4, though a single temporal integration is effected. For in FIG. 2 the damping force FD* is determined by means of the relationship $$FD^* = d \cdot v \qquad (8).$$

At the same time, however, the damping force FD* corresponds to the product of the mass m of the mobile mass and the acceleration a' of the mobile mass:

$$FD^* = m \cdot aD^* \qquad (9).$$

Inserting equation 9 into equation 8 with single temporal integration on both sides therefore produces the relationship $$m \cdot vD^* = d \cdot x \qquad (10).$$

The procedure as per FIG. 4 transforms this relationship into a control-based implementation.

Using the procedure in FIG. 4, the damping force FD* is therefore determined indirectly by virtue of the control device 9 determining the reference velocity vD* of the mobile mass relative to the mechanical structure 2, the reference velocity vD* being proportional at all times to the instantaneous displacement x of the mechanical structure 2 from the reference position x0.

Figure 5:
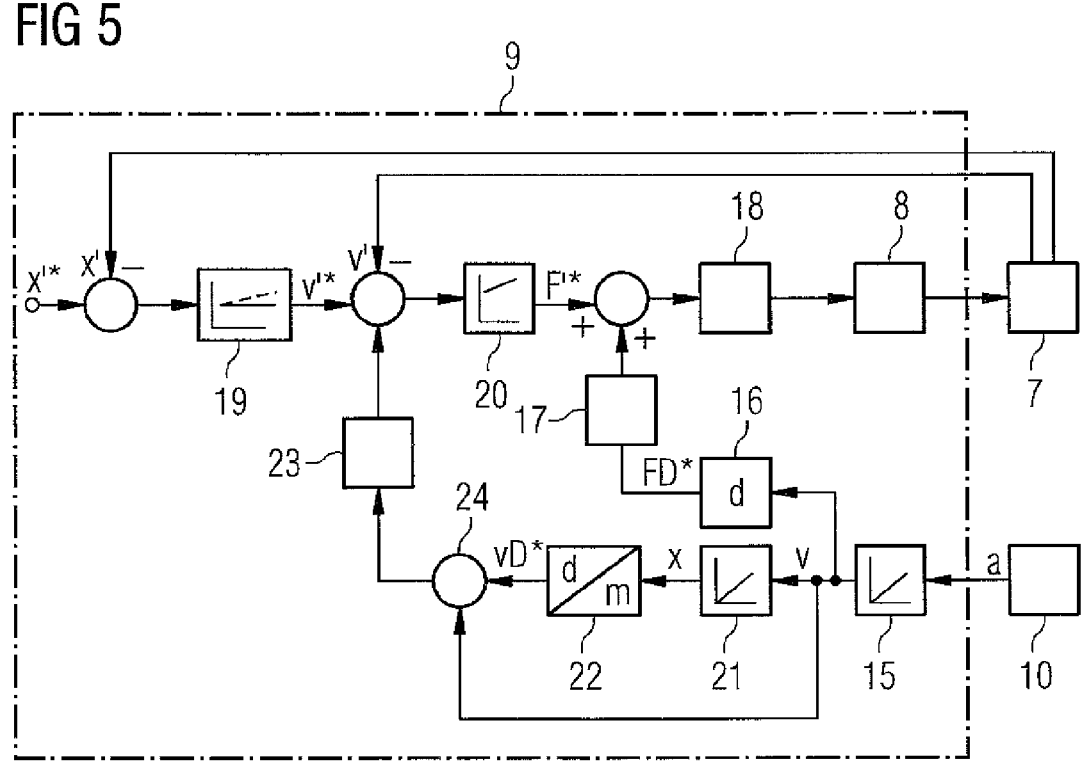

Combinations of the procedures in FIG. 2 and FIG. 4 are also possible. This is illustrated in FIG. 5. In this context, the velocity v of the mechanical structure 2 can also be applied in a node point 24 with a negative operational sign if applicable.

According to the example in FIG. 1, the vibration to be damped can be a translational vibration. Alternatively, it could be a torsional vibration or an oscillating vibration. In such cases, the damping drive 8 can be designed as a rotor-based drive. In the case of an extended mechanical structure 2 and a vibration of the mechanical structure 2 in this longitudinal direction in particular, it is however advantageous for the damping drive 8 as explained above to be designed as an electric direct linear drive corresponding to the designation "LIN" in FIG. 1.

The present invention has many advantages. In particular, it provides a simple means of damping almost any vibrations in a highly efficient manner.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for operating an active vibration damper having a damping device arranged on a vibration-susceptible mechanical structure, comprising the steps of:
   capturing, with a control device, a temporal course of a magnitude of a movement of the mechanical structure in space over an extended time period,
   determining with the control device, based on the magnitude of the movement of the mechanical structure in space, a damping force damping a vibration of the mechanical structure, wherein the damping force is proportional at all times to an instantaneous velocity of the mechanical structure,
   controlling with the control device a damping drive of the damping device, which is constructed as an electric direct linear drive and arranged on the mechanical structure, commensurate with the determined damping force, determining, with the control device, whether a predefined natural vibration of the mechanical structure is damped in a predefined manner, and directly injecting with the damping drive the determined damping force into the mechanical structure so as to automatically track a proportionality factor between the instantaneous velocity of the mechanical structure and the damping force exerted on the mechanical structure, such that the natural vibration of the mechanical structure is damped in the predefined manner.

2. The method of claim 1, wherein a resulting damping of a vibration of the mechanical structure is no greater than a maximal damping that is required for attaining a non-periodic limit of a natural vibration of the mechanical structure.

3. The method of claim 1, wherein the electric direct linear drive comprises a stator which is permanently connected to the mechanical structure and which operates on both the mechanical structure and on an armature that is movable relative to the mechanical structure.

4. The method of claim 3, further comprising the steps of:
determining with the control device a displacement of the mechanical structure from a reference position,
determining a reference velocity of the armature relative to the mechanical structure such that the reference velocity is at all times proportional to the instantaneous displacement of the mechanical structure from the reference position, and
indirectly determining, from the reference velocity, the damping force which is proportional at all times to the instantaneous velocity of the mechanical structure.

5. The method of claim 4, further comprising the steps of:
integrating an activation of the damping drive according to the determined damping force into a superordinate position control, and
in response to a displacement of the armature caused by the determined damping force from a rest position associated with the mechanical structure,
superimposing, with the superordinate position control, a return movement of the armature to the rest position or to a region containing the rest position, or
limiting, with the control device, travel of the armature to a permitted region of travel which includes the rest position.

6. The method of claim 3, wherein an additional mass is arranged on the armature of the electric direct linear drive.

7. A control program stored on a non-transitory medium and comprising machine code which, when executed by a control device operating an active vibration damper having a damping device arranged on a vibration-susceptible mechanical structure, causes the control device to operate the active vibration damper by
capturing a temporal course of a magnitude of a movement of the mechanical structure in space over an extended time period,
determining, based on the magnitude of the movement of the mechanical structure in space, a damping force damping a vibration of the mechanical structure, wherein the damping force is proportional at all times to an instantaneous velocity of the mechanical structure,
determining whether a predefined natural vibration of the mechanical structure is damped in a predefined manner,
controlling a damping drive of the damping device, which is constructed as an electric direct linear drive and arranged on the mechanical structure, commensurate with the determined damping force, and directly injecting with the damping drive the determined damping force into the mechanical structure so as to automatically track a proportionality factor between the instantaneous velocity of the mechanical structure and the damping force exerted on the mechanical structure, such that the natural vibration of the mechanical structure is damped in the predefined manner.

8. A control device for controlling an active vibration damper having a damping device arranged on a vibration-susceptible mechanical structure, wherein the control device configured to operate the active vibration damper by:
capturing a temporal course of a magnitude of a movement of the mechanical structure in space over an extended time period,
determining, based on the magnitude of the movement of the mechanical structure in space, a damping force damping a vibration of the mechanical structure, wherein the damping force is proportional at all times to an instantaneous velocity of the mechanical structure,
determining whether a predefined natural vibration of the mechanical structure is damped in a predefined manner,
controlling a damping drive of the damping device, which is constructed as an electric direct linear drive and arranged on the mechanical structure, commensurate with the determined damping force, and
directly injecting with the damping drive the determined damping force into the mechanical structure so as to automatically track a proportionality factor between the instantaneous velocity of the mechanical structure and the damping force exerted on the mechanical structure, such that the natural vibration of the mechanical structure is damped in the predefined manner.

9. An active vibration damper, comprising:
a damping device arranged on a vibration-susceptible mechanical structure and comprising a damping drive configured to directly inject a damping force into the mechanical structure,
at least one sensor configured to measure a magnitude of a movement of the mechanical structure in space, and
a control device connected with the at least one sensor for data transfer for receiving values measured by the at least one sensor and connected with the damping drive for controlling the damping drive, wherein the control device is configured to:
capture a temporal course of an absolute movement of the mechanical structure in space over an extended time period,
determine, based on the magnitude of the movement of the mechanical structure in space, a damping force damping a vibration of the mechanical structure, wherein the damping force is proportional at all times to an instantaneous velocity of the mechanical structure,
determine whether a predefined natural vibration of the mechanical structure is damped in a predefined manner,
control a damping drive of the damping device, which is constructed as an electric direct linear drive and arranged on the mechanical structure, commensurate with the determined damping force, and
directly inject with the damping drive the determined damping force into the mechanical structure so as to automatically track a proportionality factor between the instantaneous velocity of the mechanical structure and the damping force exerted on the mechanical structure, such that the natural vibration of the mechanical structure is damped in the predefined manner.

* * * * *